Jan. 14, 1941.                R. FUNK                2,228,760
                              FASTENER
                         Filed Feb. 7, 1939
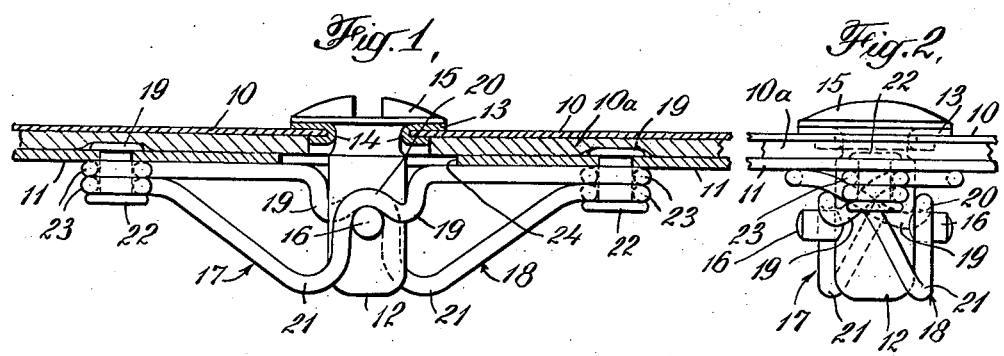
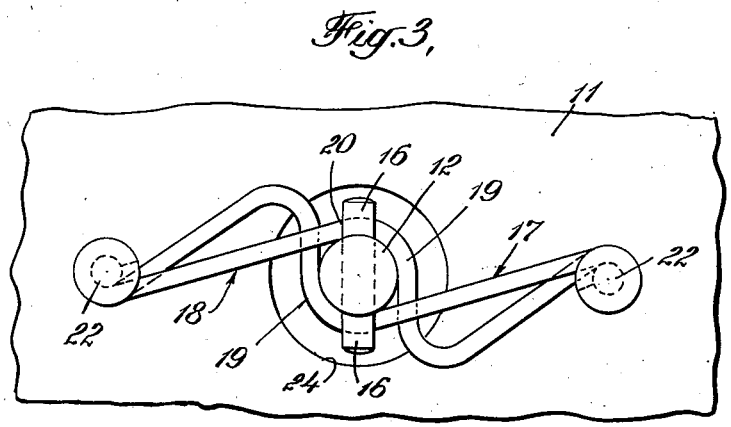
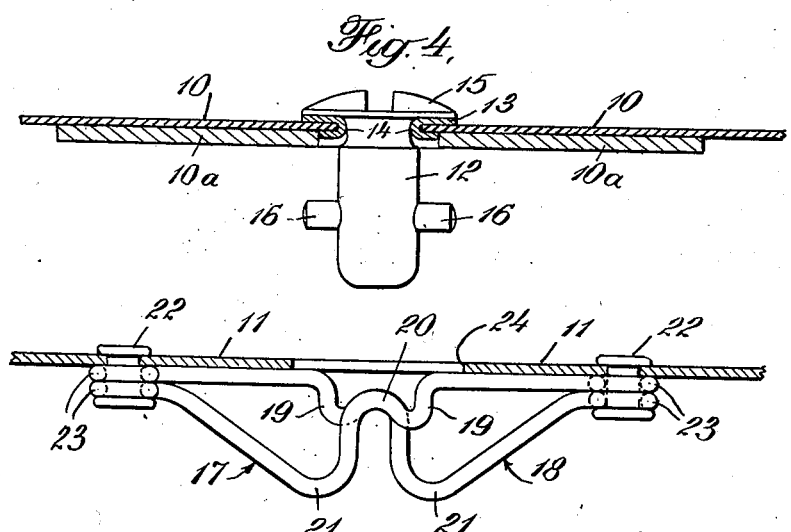
INVENTOR
Rudolph Funk
BY
Hoguet, Neary & Campbell
ATTORNEY Patented Jan. 14, 1941

2,228,760

UNITED STATES PATENT OFFICE 2,228,760

FASTENER

Rudolph Funk, Hagerstown, Md., assignor to Fairchild Engine and Airplane Corporation, New York, N. Y., a corporation of Maryland Application February 7, 1939, Serial No. 254,992

3 Claims. (Cl. 24—221)

This invention relates to fastening devices and has as its principal object the provision of fastening devices which are self locking, inexpensive, simple to operate and which are under spring tension when closed, thereby acting to eliminate or reduce vibration and rattling of the fastening.

Fasteners embodying the present invention are characterized by a rotatable locking stud having lugs projecting therefrom which cooperate with resilient camming and locking elements to draw the members to which they are secured into and retain them in tight relationship. More particularly, the camming elements may consist of springs having an inclined portion terminating in a downwardly offset portion and an upwardly bent portion forming a stop shoulder. With this construction, the stud may be rotated to cause the lugs thereon to engage and move along the inclined portions of the cam surfaces, compressing the springs until the lugs snap into the offset portions and the stop shoulders prevent further rotation of the stud. When the fastening devices are connected, the springs are under tension and thus lock the stud in place. At the same time they exert a resilient pressure and tend to absorb vibration.

Fastening devices embodying the present invention are particularly suitable for use in detachably connecting members that are subjected to vibration, for example, the cowlings and other removable parts of aeroplanes, inasmuch as they exert a resilient pressure and thereby eliminate rattling or loosening of the parts.

For a more complete understanding of this invention, reference may be had to the accompanying drawing, wherein:

Figure 1 is a side view of a typical form of fastening device embodying the present invention with supporting members shown in section and the fastening device in closed position;

Figure 2 is an end view of the fastening device shown in Figure 1;

Figure 3 is a view in elevation of the fastening device;

Figure 4 is a side view showing the fastening device with the cooperating elements disengaged.

The form of fastening device disclosed in the drawing is illustrated as applied to two sheets of metal 10 and 11, although it may be applied to any shape or type of members that may desirably be connected. Referring to Figures 1 and 4, member 10 carries a locking stud 12 which is rotatably mounted within a bushing, 13. The bushing 13 is fixed to the member 10 and engages in a groove 14 in the stud 12 to retain the stud in member 10. Stud 12 has a slotted head 15 for receiving a screw driver to rotate it and is provided with oppositely directed lugs 16 at its inner end. Other forms of heads 15 may be provided as the purpose demands.

As shown in Figure 4, member 11 is provided with a pair of springs 17 and 18, which cooperate with the stud 12 to lock the members 10 and 11 together. Each of the springs 17 and 18 is generally S-shaped in plan, as shown in Figure 3, and is provided with an inclined portion 19 of generally helical shape substantially concentric with the axis of the stud 12. At the outer end of the inclined portion 19 the springs are provided with a reversely curved portion formed by bending the springs inwardly to form an offset or depressed portion 20 and then outwardly to form a shoulder 21 which acts as a stop to prevent over-rotation of the stud 12.

The springs 17 and 18 may be attached to member 11 in any desired way, such as by means of rivets 22 passing through loops 23 in the ends of the springs. The springs overlie a portion of the member 11 with the inclined portion 19 substantially concentric with an aperture 24 therein through which the stud 12 is passed.

To operate the fastening device, and with the parts in the position shown in Figure 4, the stud 12 is inserted through the aperture 24 and rotated. The lugs 16 engage the inner ends of the inclined portions 19 and ride up them, at the same time moving the members 10 and 11 into engagement. Upon continued rotation of the stud 12, the springs 17 and 18 are compressed and the lugs 16 move into the offset or depressed portions 20 and against the shoulders 21. The tension of the springs tends to retain the lugs 16 in the offset portions 20, as shown in Figures 1 to 3. Rotation of the stud 12 in the opposite direction frees the members 10 and 11 for separation.

It will be understood that the shape and proportions of the fastening device may be varied as the purpose demands and that it may be used for detachably and resiliently connecting all types of members or elements to each other. Therefore, the fastening device described should be considered as illustrative and not as limiting the scope of the following claims.

I claim:

1. In a device for detachably connecting a plurality of members, the combination of an element rotatably mounted on one of said members and having a laterally projecting lug thereon, substantially S-shaped springs on a second member, each spring having its ends fixed to said second member and a central inclined portion substantially concentric with the axis of said element, an offset portion adjacent the outer end of said inclined portion for receiving said lug and a stop shoulder adjacent said offset portion for preventing over-rotation of said element.

2. In a device for detachably connecting a plurality of members, the combination of an element having laterally projecting lugs thereon rotatably mounted on one of said members, a plurality of springs on a second member, each spring having one end portion engaging flatly against said second member, a central cam portion inclined outwardly from said end portion at least partially concentric with said element, a reversely curved portion adjacent the outer end of said cam portion forming an inwardly directed offset and an outwardly directed stop shoulder and another end portion inclined from said stop shoulder inwardly toward and fixed to said member whereby upon rotation of said element the lugs move along the helical portions compressing the springs and drawing the members together and engage in the offset and against the stop shoulder to lock the element against further rotation and maintain it under tension.

3. In a device for detachably connecting a plurality of members, the combination of a stud having laterally projecting lugs thereon rotatably mounted on one member and insertable through an aperture in a second member, a pair of springs disposed on the side of the second member away from said one member and partially overlying said aperture, each spring having one end portion engaging flatly against said second member, a central cam portion inclined outwardly from said end portion and at least partially concentric with said aperture, a reversely curved portion adjacent the outer end of said cam portion forming an inwardly directed offset portion and an outwardly directed stop shoulder and another end portion inclined from said stop shoulder inwardly toward and fixed to said second member.

RUDOLPH FUNK.